United States Patent [19]
Bense

[11] 3,968,939
[45] July 13, 1976

[54] TRAVERSE CAM LUBRICATION

[75] Inventor: William Malcolm Bense, Barrington, R.I.

[73] Assignee: Leesona Corporation, Warwick, R.I.

[22] Filed: May 2, 1975

[21] Appl. No.: 573,873

[52] U.S. Cl. .............................. 242/43 R; 184/6.26; 184/58; 242/158.3
[51] Int. Cl.² .................. B65H 54/28; F16N 17/06
[58] Field of Search ............ 184/6.26, 58, 59, 50 A, 184/56 R, 1 R, 11 R, 7 A; 242/43 R, 158.3, 158.5

[56] References Cited
UNITED STATES PATENTS

| | | | |
|---|---|---|---|
| 2,174,854 | 10/1939 | Corwin | 184/6.26 X |
| 2,794,517 | 6/1957 | Keith | 184/1 R |
| 3,248,064 | 4/1966 | Rollings | 242/43 |
| 3,527,422 | 9/1970 | Conrad | 242/43 |
| 3,624,763 | 11/1971 | Rohr | 184/6.26 X |
| 3,665,684 | 5/1972 | White | 184/56 R X |
| 3,672,586 | 6/1972 | Morton | 184/11 R X |
| 3,877,547 | 4/1975 | Willuweit et al. | 184/6.26 |

*Primary Examiner*—Richard C. Pinkham
*Assistant Examiner*—Arnold W. Kramer
*Attorney, Agent, or Firm*—Burnett W. Norton

[57] ABSTRACT

Disclosed herein is mechanism for lubricating the traverse portion of winding apparatus. The lubricating mechanism includes an atomizing system for introducing an oil mist into a housing which generally encloses a traverse cam mounted for rotation on suitable bearings within the housing. The oil mist is effective to lubricate the various parts of the traverse system notwithstanding that the traverse cam may be rotating at speeds of 7,000 r.p.m. and higher. The housing enclosing the traverse cam is provided with a slot through which a strand guide, attached to a cam follower, projects. The cam follower is engaged in an endless groove in the traverse cam and as the traverse cam is rotated the guide is reciprocated from end to end of the traverse cam groove and is thus operable to distribute an advancing strand with which it is engaged onto a rotating package. The oil mist is precluded from escaping through the slot in the housing by means of an impeller which operates to create a zone of negative pressure within the traverse cam housing. By such construction the oil mist is drawn to a sump area within the housing and directionally away from the traverse slot. Thus, effective lubrication of the traverse mechanism and associated parts is achieved while any substantial escape of the oil mist through the traverse slot is precluded.

5 Claims, 3 Drawing Figures

TRAVERSE CAM LUBRICATION

The present invention relates to winding machines and relates, more particularly, to means for lubricating the traverse mechanism of such machines.

BACKGROUND OF THE INVENTION

Winding machines for winding packages of textile strand material are old in the art and customarily include a rotating spindle which rotates the winding package of yarn or other strandular material and a guide for reciprocating the strand material longitudinally of the winding package. In one form of winding machine the strand guide is a reciprocating member which is traversed longitudinally of the winding package by means of a rotatable traverse cam. These rotatable traverse cams are commonly lubricated by daubing them with grease or oil or both. In U.S. Pat. No. 2,794,517 there is disclosed a system for lubricating a traverse cam by means of a wick system which supplies lubricant to the traverse cam as the cam is rotated. Techniques such as the daubing of lubricant onto the parts of a traverse cam are adequate when the cams are operated at slow speeds. The wick system as disclosed in U.S. Pat. No. 2,794,517 performs quite well for moderately higher speeds. However, both systems are inadequate for lubricating traverse cams that are rotated at very high speeds. That is, in the order of 7,000 r.p.m. and higher for a typical 2½ inch diameter, multi-turn or "scroll" cam.

The applied oil and/or daubed grease will fly off a cam quite quickly when the cam is rotated at the very high speeds just mentioned. This is due to the centrifugal force at such high speeds. The oil wick arrangement disclosed in the afore-mentioned patent does function quite efficiently to pick up oil from the sump and bring it to the end of the traverse cam. However, the oil when so delivered tends to fly off the cam almost instantaneously, thus leaving the cam grooves and associated rotating and reciprocating parts essentially dry.

SUMMARY OF THE INVENTION

In overcoming the deficiencies of the prior art the present invention makes use of the well known principle of "oil mist" lubrication wherein a moving body will pick up oil as a fine film from an oil mist ambient atmosphere. Advantageously arranged in cooperation with the oil mist lubrication feature of the present invention is an impeller which is employed within the housing to create a zone of negative pressure therein sufficient to cause an inward drift of air through the traverse slot through which the strand guide extends. This prevents the oil mist from drifting outward of the housing through the aforementioned slot and onto the advancing strand and, of equal importance, contains the mist within the housing to effectively lubricate the traverse cam and related parts. In the absence of such mechanism for precluding the oil mist from escaping through the traverse slot, the oil mist would drift outward through the slot to collect on the strand, bail, and adjacent parts of the winding mechanism, thereby causing the strand and package to be coated with a film of oil. This would create an unsatisfactory condition in the yarn package and also could result in insufficient lubrication of the traverse cam and related parts due to escape of the oil mist from within the housing.

In keeping with the foregoing it is one object of the present invention to provide means for lubricating the traverse cam and related parts of a traversing mechanism even when the mechanism is being operated at very high speeds.

Another object of the present invention is to provide apparatus for supplying oil mist lubrication to the traverse cam and related parts of a high speed traversing mechanism while precluding escape of the oil mist from the zone in proximity to the traversing mechanism.

Other objects of the invention will in part be obvious and will in part appear hereinafter.

The invention accordingly comprises the apparatus possessing the construction, combination of parts and arrangement of elements which are exemplified in the following detailed disclosure, and the scope of the application of which will be indicated in the claims.

BRIEF DESCRIPTION OF THE DRAWING

For a fuller understanding of the nature and objects of the invention reference should be had to the accompanying description taken in connection with the drawing wherein.

DESCRIPTION OF THE PREFERRED EMBODIMENT

In brief, the present invention is directed to the improved mechanism for lubricating the traverse portion of winding apparatus. Typically, the traverse portion includes a barrel cam confined within a housing and having an endless cam groove formed in its cylindrical surface and provided with a cam follower having a strand guide at the outer end thereof, the follower riding in the cam groove and being constrained to a linear path of travel by gibs aligned along an access slot in the housing for the follower and guide. An atomizing unit is provided for introducing an oil mist into the housing. The oil mist is deposited on the surface of the barrel cam and passes into the cam groove where it is picked up by the cam follower. Obviously, the oil mist may also serve to lubricate the bearings on which the cam rotates and other parts within the traverse housing. As mentioned previously, the traverse housing includes an elongated slot through which the strand guide extends to engage a strand to be traversed onto a rotating package. An impeller is mounted proximate one end of the barrel cam, and preferably at the end remote from the point where the oil mist is introduced into the housing. The impeller acts to create a negative pressure within the housing sufficient to cause an inward drift of air through the elongated slot. This, in turn, prevents the oil mist from drifting outward through the slot. A well or sump is formed in the housing proximate to the impeller for holding the oil which precipitates out of the atmosphere. An appropriate drain is provided to remove the collected oil from the interior of the housing and vent the air from within the housing.

The present invention can be used advantageously with any of a variety of winding machines for winding packages of textile material of which the structure shown in U.S. Pat. No. 2,740,589 is but one example. In view of the fact that winding machines of the type with which the present invention can be employed are well known in the art and the manner in which the present invention can be applied to such structures will be apparent to those skilled in the art, it is not deemed necessary to present a detailed description of such a winding machine. However, in the interest of clarity it will be of advantage to briefly discuss the general construction of a textile winding machine of the type with which the present invention can be advantageously employed.

Figure 1:
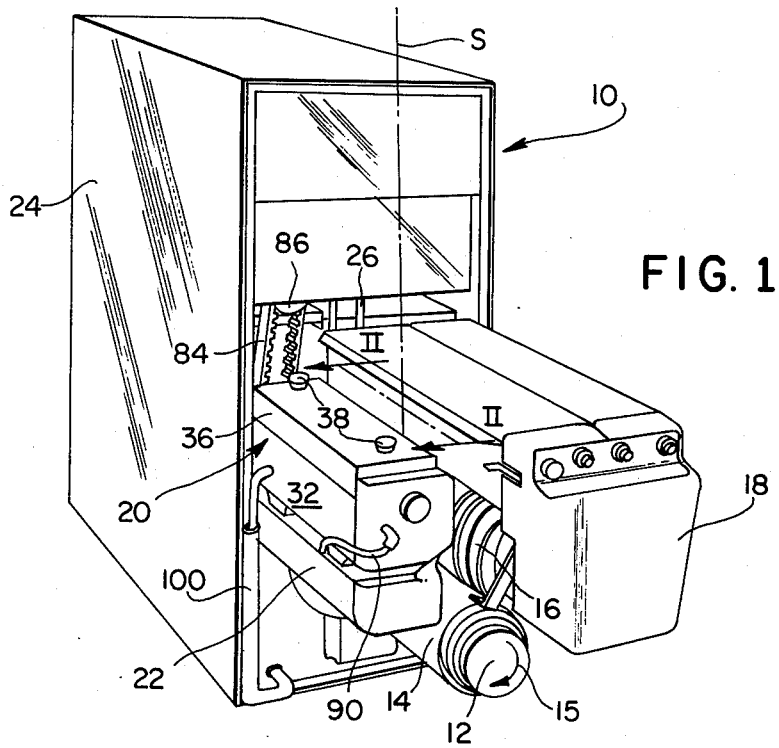
FIG. 1 is a perspective view of high speed strand winding apparatus incorporating the present invention.

Thus, with initial reference to FIG. 1, a textile winding machine 10 of the type commonly referred to as a take-up machine is shown. Winding machine 10 is adapted to wind strandular material advancing from a source of supply such as a spinneret into a textile package. Machine 10 includes a winding spindle 12 onto which a tube 14 is secured for receiving an advancing strand S. Tube 14 is driven in the direction of the arrow 15 by a rotating drive roll 16 which engages with the periphery of the tube, and ultimately with the package of yarn wound on the tube, to thereby rotate the same. Drive roll 16 is driven from an electric motor, not shown. Said drive roll 16 is mounted on a counter weighted carriage 18 which moves upwardly as a package being wound on tube 14 increases in diameter, drive roll 16 always bearing on the surface of either tube 14 or the package of strandular material being wound thereon.

Figure 2:
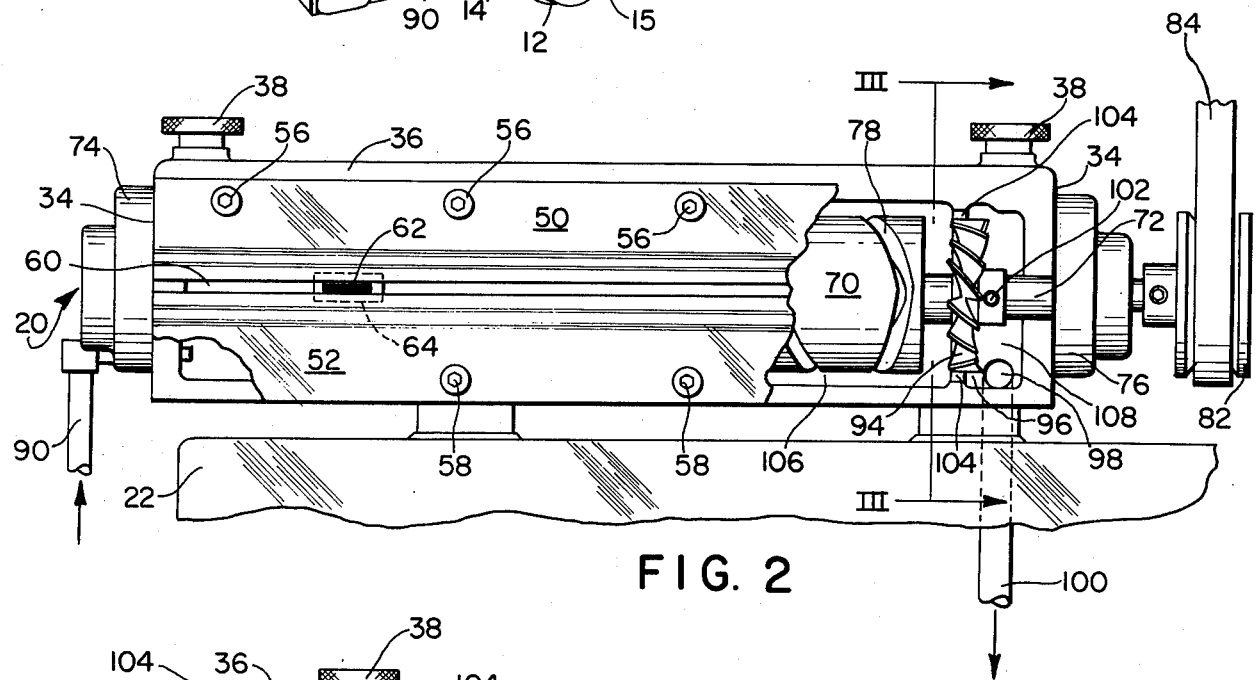
FIG. 2 is a view looking along lines II — II of FIG. 1 showing details of the present invention in combination with the winding apparatus traversing mechanism, parts being broken away for clarity.
Figure 3:
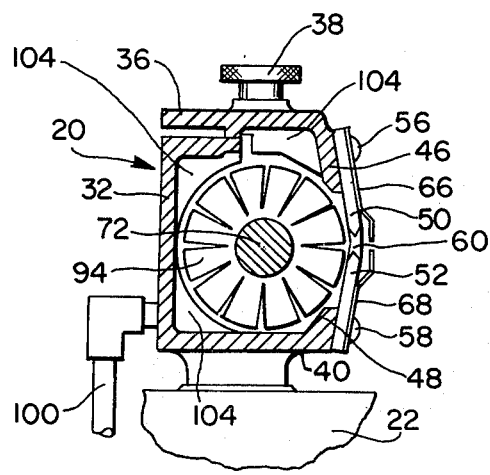
FIG. 3 is a view taken long lines III — III of FIG. 2.

With continuing reference to FIG. 1 a housing 20 is mounted on a support beam 22. In turn, beam 22 is connected with carriage 18 interiorly of machine enclosure 24 so that carriage 18 and housing 20 move up and down as a unit under the control of cable 26. Housing 20 includes a rear wall 32, opposing end walls 34, a top cover 36 which is secured in place by bolts 38, and a bottom wall 40 formed as a right angle portion of rear wall 32. As best seen in FIG. 3 cover 36 has a depending edge or flange 46 which extends to provide a portion of a front wall of housing 20. Similarly, bottom wall 40 has an upturned edge or flange 48 which provides another portion of a front wall. Flanges 46 and 48 serve as mounts for gibs 50 and 52, respectively, these gibs being secured to their respective front wall portions by means of screws 56 and 58 respectively. Viewing FIGS. 2 and 3 gibs 50 and 52 are mounted so as to provide a slot 60 therebetween. This slot 60 affords a clearance through which a strand guide 62 attached to and projecting from a cam follower 64 within housing 20 may extend. Again, viewing FIG. 3, it will be seen that relatively thin metal guards 66 and 68 are fastened on the external faces of gibs 50 and 52, respectively by means of the same screws holding the gibs in place. These guards 66 and 68 are so positioned as to provide a relatively narrow slot therebetween in alignment with slot 60. Guards 66 and 68 serve to prevent the entry of any substantial amount of lint or other impurities into the interior of housing 20 while gibs 50 and 52 control the path of guide 62.

Returning now to FIG. 2, housing 20 encloses therewithin a barrel cam 70 which is fixedly secured to a shaft 72 for rotation thereby. Shaft 72 is suitably journaled for rotation in pedestal bearings 74 and 76 affixed to the opposite end walls of housing 20. An endless helical cam groove 78 is formed in the surface of barrel cam 70 and extends generally from one end of the barrel cam to the other. It has already been explained that this cam groove 78 receives the shoe or cam follower 64 and reciprocates the same from reversal point to reversal point of the cam groove 78 in response to rotation of barrel cam 70. Accordingly, strand guide 62 which is affixed onto follower 64 for movement therewith and which extends outwardly of housing 20 through slot 60 is reciprocated generally from end to end of slot 60. The forward outer end of strand guide 62 is configured to engage and traverse the advancing strand S onto drive roll 16 and subsequently onto tube 14 as the tube is rotated by drive roll 16. As best seen in FIG. 2 the outer end of shaft 72 has a pulley 82 affixed thereto about which a drive belt 84 is engaged. This drive belt is driven by suitable means such as electric motor 86 mounted within enclosure 24.

In order that an oil mist may be introduced into the interior of housing 20 for lubricating cam groove 78 and other parts interiorly of housing 20 there is provided an oil mist supply line 90 which may incorporate an oil supply pipe and a suitable atomizing system for presenting the oil into the interior of housing 20 in the form of an oil mist, that is to say, particles of oil suspended in the atmosphere within housing 20. As shown in FIG. 2 this atomizer supply line 90 enters housing 20 through the outer one of the end walls 34, i.e., the end wall remote from enclosure 24. At the opposite end of housing 20 from the point where supply line 90 enters said housing and affixed on shaft 72 there is provided an impeller 94. Impeller 94 is rotatable in conjunction with rotation of shaft 72 and barrel cam 70. This impeller acts to create a negative pressure within housing 20 for purposes of drawing the oil mist presented therein at the opposite end of the housing toward a sump or well 96 where the oil may precipitate out and be collected in the well 96 for ultimate discharge through a waste port 98 and oil line 100. It will be noted that impeller 94 is affixed on shaft 72 by means of a set screw 102 so that the impeller can be adjusted axially along shaft 72. It will also be observed that a wall 104 extends inwardly into the interior of housing 20 to form a suitable orifice generally surrounding impeller 94. Wall 104 is generally cast integrally within housing 20, although as best seen in FIG. 3, a portion of the wall is cast in cover 36. Thus, wall 104 divides the interior of the housing into a first housing section 106 within which barrel cam 70 is located. The area at the right hand end of wall 104, viewing FIG. 2, is a further housing section 108 which essentially defines a receiving chamber for impeller 94 and which creates one wall of the sump or well 96. By loosening said screw 102 and adjusting impeller 94 axially along shaft 72 and permitting it to be placed at the desired location in the orifice, the degree of the negative pressure exerted by the rotating impeller can be adjusted.

The operation of the present invention will be more or less apparent from the foregoing description. In summary, the present invention operates in the following manner. An oil mist is introduced into the interior of housing 20 through oil mist line 90. As barrel cam 70 is rotated cam follower 64 is operated to cause strand guide 62 to reciprocate along slot 60. The forward or outer end of strand guide 62 engages a strand S advancing toward tube 14 and traverses the strand to and fro onto drive roll 16 and subsequently onto the core. The oil mist introduced into the interior of housing 20 is drawn toward housing section 108 as impeller 94 is rotated coincident with the rotation of its mounting shaft 72 and barrel cam 70. As the oil arrives within housing section 108 it partially precipitates out collecting in well 96 where it is drained under gravity through port 98 and line 100. This port and line also operate to drain off oil mist accumulating in the region of the port and line, and also serve as a vent for air within housing 20. Both oil lines 90 and 100 are flexible or are constructed to have telescoping sections so as to adjust to the vertical movement of carriage 18 and housing 20.

The present invention thus provides a novel and advantageous system for lubricating the traverse portion of winding apparatus even while such apparatus is being operated at very high speeds while precluding substantial escape of the lubricant from the traverse portion.

Since certain changes may be made in the above apparatus without departing from the scope of the invention herein involved, it is intended that all matter contained in the above description as shown in the accompanying drawing shall be interpreted as illustrative only and not in a limiting sense.

What is claimed is:

1. In a traverse mechanism for winding apparatus the combination comprising, a housing having an elongated slot therein, an elongated member supported on a shaft rotatably journaled in said housing, said member being operatively connected with a strand guide, said guide extending through said slot and reciprocated from end to end of said slot on rotation of said member in a position to engage and traverse an advancing strand onto a rotating package, means for introducing oil mist into one end of said housing, and an impeller mounted on said shaft near the other end of said housing adjacent vent means whereby on rotation of said member said impeller creates a zone of reduced pressure within said housing thereby drawing said oil mist within the housing and directionally away from said slot and venting the pressure through said vent means.

2. Apparatus as set forth in claim 1 including means for adjusting the location of said impeller axially along said shaft.

3. Apparatus as set forth in claim 1 wherein said impeller is mounted on said shaft in a position spaced apart from said member, and said apparatus includes a barrier extending inwardly from said housing between said member and said impeller forming a sump for collecting the oil mist within said housing.

4. Apparatus as set forth in claim 1 wherein said housing has front and end walls, said slot being formed in said front wall, and said means for introducing said oil mist being positioned in said end wall.

5. Apparatus as set forth in claim 1 wherein said member is a roll having a cam groove formed therein, and said strand guide includes a portion engaged in said groove for reciprocating movement in response to rotation of said roll.

* * * * *